(12) United States Patent
Huang et al.

(10) Patent No.: US 12,066,627 B2
(45) Date of Patent: Aug. 20, 2024

(54) HEAD-UP DISPLAY SYSTEM

(71) Applicant: Innolux Corporation, Miao-Li County (TW)

(72) Inventors: Yu-Chia Huang, Miao-Li County (TW); Tsung-Han Tsai, Miao-Li County (TW); Chin-Lung Ting, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/678,033

(22) Filed: Feb. 23, 2022

(65) Prior Publication Data
US 2022/0308346 A1    Sep. 29, 2022

(30) Foreign Application Priority Data

Mar. 23, 2021   (CN) .................. 202110310798.X

(51) Int. Cl.
*G02B 27/01*  (2006.01)
*B60K 35/00*  (2024.01)
*B60K 35/23*  (2024.01)

(52) U.S. Cl.
CPC .......... *G02B 27/0101* (2013.01); *B60K 35/00* (2013.01); *B60K 35/23* (2024.01); *B60K 2360/336* (2024.01); *G02B 2027/0141* (2013.01)

(58) Field of Classification Search
CPC ... G02B 27/01–0189; G02B 2027/0105–0198; B60K 2370/00–98; B60K 2360/00–96; B60K 35/00–90
See application file for complete search history.

(56) References Cited

U.S. PATENT DOCUMENTS

| 2003/0020880 A1* | 1/2003 | Knoll ................. G02B 27/0101 353/13 |
| 2015/0061976 A1 | 3/2015 | Ferri |
| 2015/0260987 A1 | 9/2015 | Weingarten et al. |
| 2016/0109714 A1* | 4/2016 | Chen ..................... B60K 35/00 353/13 |
| 2017/0146803 A1* | 5/2017 | Kishigami ............ B60K 35/00 |

(Continued)

FOREIGN PATENT DOCUMENTS

| CN | 105445936 | 3/2016 |
| CN | 112444976 | 3/2021 |
| DE | 102016211823 | 1/2018 |

(Continued)

OTHER PUBLICATIONS

"Office Action of Taiwan Counterpart Application", issued on Oct. 5, 2022, p. 1-p. 5.

(Continued)

*Primary Examiner* — Bao-Luan Q Le
*Assistant Examiner* — Christopher A Lamb, II
(74) *Attorney, Agent, or Firm* — JCIPRNET

(57) ABSTRACT

A head-up display system for a vehicle having a windshield is provided. The head-up display system includes a first image generation device and an optical system. The first image generation device is configured to provide a first light. The optical system is configured to reflect the first light. A first distance between the first image generation device and the optical system is greater than a second distance between the optical system and the windshield.

8 Claims, 13 Drawing Sheets

(56) References Cited

U.S. PATENT DOCUMENTS

2018/0093625 A1* 4/2018 Shintani .............. G06V 40/174
2020/0218068 A1   7/2020 Takahashi

FOREIGN PATENT DOCUMENTS

| JP | 5145710    | 2/2013 |
| JP | 2019031270 | 2/2019 |
| TW | 202001338  | 1/2020 |

OTHER PUBLICATIONS

"Search Report of Europe Counterpart Application", issued on Aug. 12, 2022, pp. 1-8.
"Office Action of China Counterpart Application", issued on May 17, 2024, pp. 1-11.

* cited by examiner

HEAD-UP DISPLAY SYSTEM

CROSS-REFERENCE TO RELATED APPLICATION

This application claims the priority benefit of China application serial no. 202110310798.X, filed on Mar. 23, 2021. The entirety of the above-mentioned patent application is hereby incorporated by reference herein and made a part of this specification.

BACKGROUND

Technical Field

The disclosure relates to a display system, and more particularly relates to a head-up display system.

Description of Related Art

When a head-up display is combined with augmented reality (AR) technology, a requirement of imaging display information at a distance thus appears, such as imaging the display information on roads for allowing a driver to see the display information and road conditions at the same time without changing a line of sight. In order to image the display information at a distance, an optical path length of the head-up display system is required to be increased. However, the head-up display can only be disposed in a confined space due to limited vehicle space. In addition, increasing the optical path length by using multiple reflective optical elements will increase the volume and cost.

SUMMARY

The disclosure provides a head-up display system, which images display information at a distance.

According to an embodiment of the disclosure, a head-up display system is used for a vehicle having a windshield. The head-up display system includes a first image generation device and an optical system. The first image generation device is configured to provide a first light. The optical system is configured to reflect the first light. A first distance between the first image generation device and the optical system is greater than a second distance between the optical system and the windshield.

According to another embodiment of the disclosure, a head-up display system is used for a vehicle having a windshield and an accommodating space extending away from the windshield. The head-up display system includes a first image generation device and an optical system. The first image generation device is configured to provide a first light. The optical system is configured to reflect the first light. The first image generation device is disposed in the accommodating space.

In order to make the aforementioned features and advantages of the disclosure comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
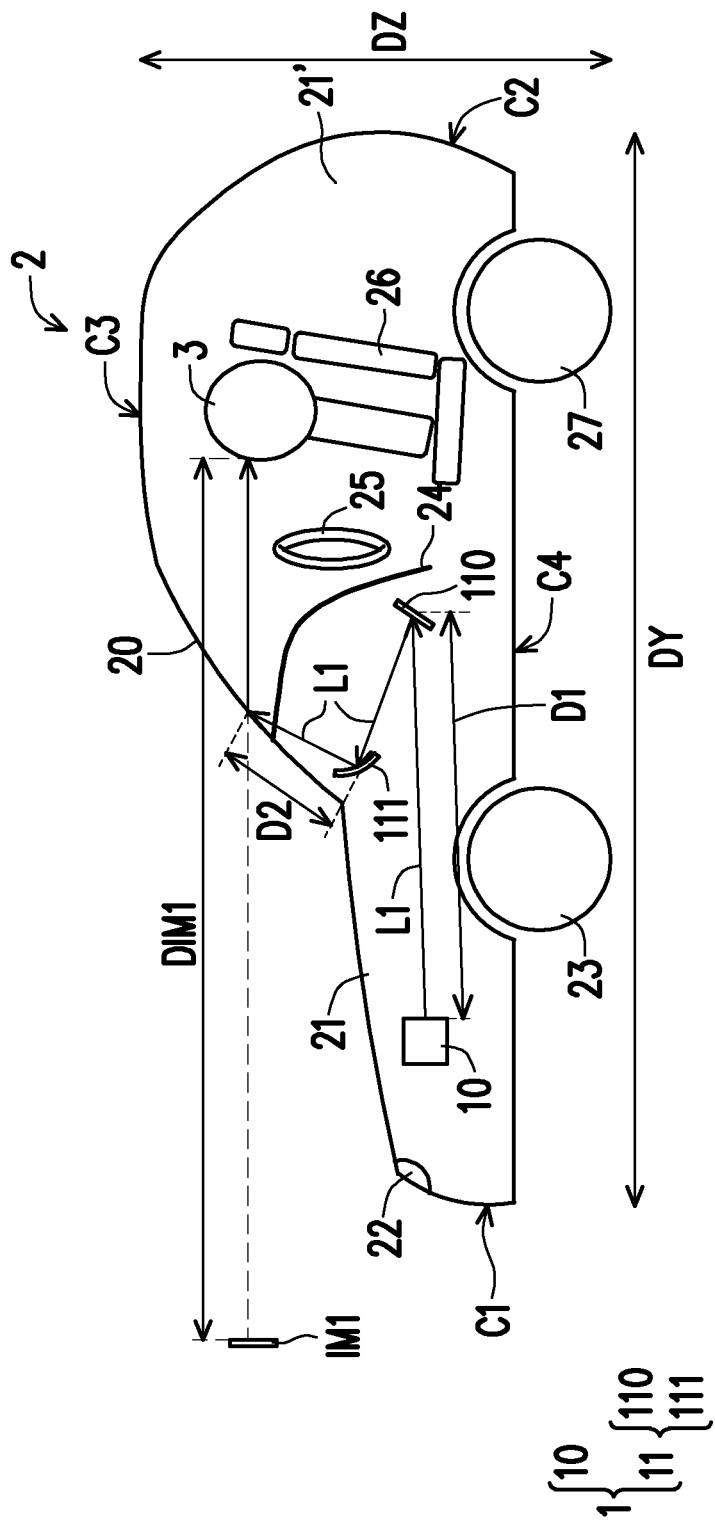
FIG. 1 is a partial cross-sectional schematic view of a head-up display system according to a first embodiment of the disclosure.

The disclosure may be understood by referring to the following detailed description in conjunction with the accompanying drawings. It should be noted that, in order to facilitate understanding and for concision of the drawings, only a part of the electronic device/display device is shown in multiple drawings in the disclosure, and certain elements in the drawings are not drawn to actual scale. In addition, the number and size of each element in the drawings are only exemplary and are not used to limit the scope of the disclosure. For example, the relative size, thickness, and location of layers, regions, or elements may be reduced or enlarged for clarity.

Certain words will be used to refer to specific elements throughout the specification and the appended claims of the disclosure. People skilled in the art should understand that electronic device manufacturers may refer to same elements under different names. The disclosure does not intend to distinguish between elements having same functions but different names. In the following specification and claims, the words "having" and "including" are open-ended words and thus should be interpreted as "including but not limited to."

Wordings used herein to indicate directions, such as "up," "down," "front," "back," "left," and "right," merely refer to directions in the accompanying drawings. Therefore, the directional wordings are used to illustrate rather than limit the disclosure. It should be understood that when an element or film layer is indicated to be disposed "on" or be "connected to" another element or film layer, the element or film layer may be directly on or be directly connected to another element or film layer, or other elements or film layers may exist therebetween (not directly). In contrast, when an element is indicated to be "directly on" or "directly connected to" another element or film layer, no other elements or film layers exist therebetween.

The terms "approximately," "equal to," "equivalent to," "same," "substantially," or "roughly" referred to herein generally mean within 10% of a given value or range, or mean within 5%, 3%, 2%, 1%, or 0.5% of a given value or range. In addition, the phrases "in a given range from a first value to a second value" and "within a given range from a first value to a second value" indicate the given range includes the first value, the second value, and other values therebetween.

In some embodiments of the disclosure, terms concerning attachments and connections such as "connected," "interconnected," and the like, unless defined otherwise, mean two elements directly contact each other, or mean the two elements do not directly contact each other and other elements are disposed therebetween. The terms concerning attachments and connections may also include a relationship in which both of the two elements are movable or fixed. In addition, the terms "electrically connected to" and "coupled to" include any direct and indirect electrical connection means.

In the embodiments, the same or similar elements will be designated by the same or similar reference numerals, and descriptions thereof will be omitted. In addition, as long as the features in different embodiments do not violate or conflict with the spirit of the disclosure, they may be arbitrarily mixed and matched, and simple equivalent changes and modifications made in accordance with this specification or claims are still within the scope of the disclosure. Moreover, the terms such as "first" and "second" mentioned in the specification or the claims are only used to name different elements or to distinguish different embodiments or scopes, and are not intended to limit the upper or lower limit of the number of the elements, nor are they intended to limit the manufacturing order or disposition order of the elements.

Figure 2:
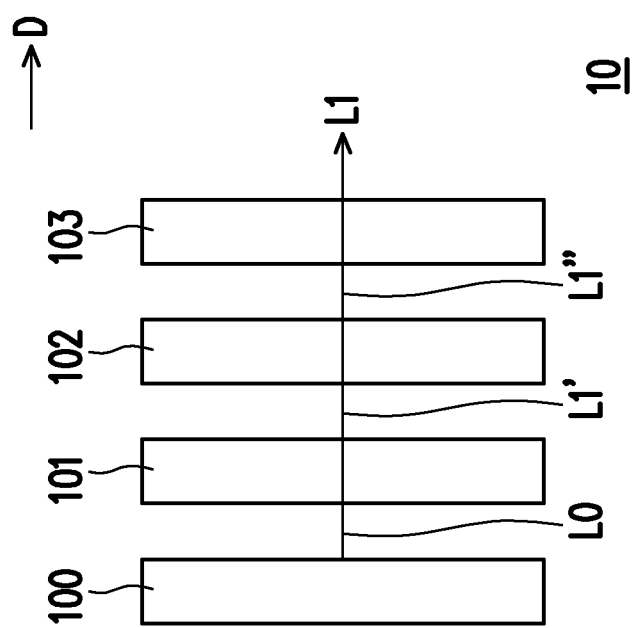
FIG. 2 is an exploded schematic view of a first image generation device in FIG. 1.
Figure 11:
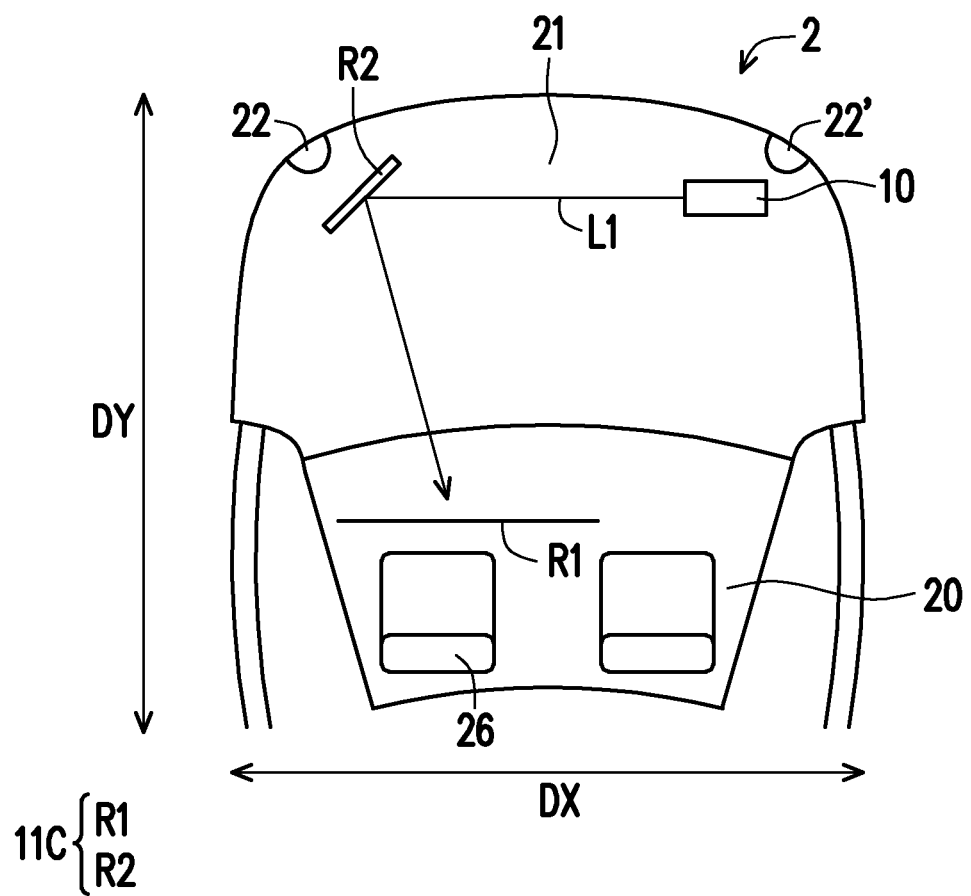
Figure 12:
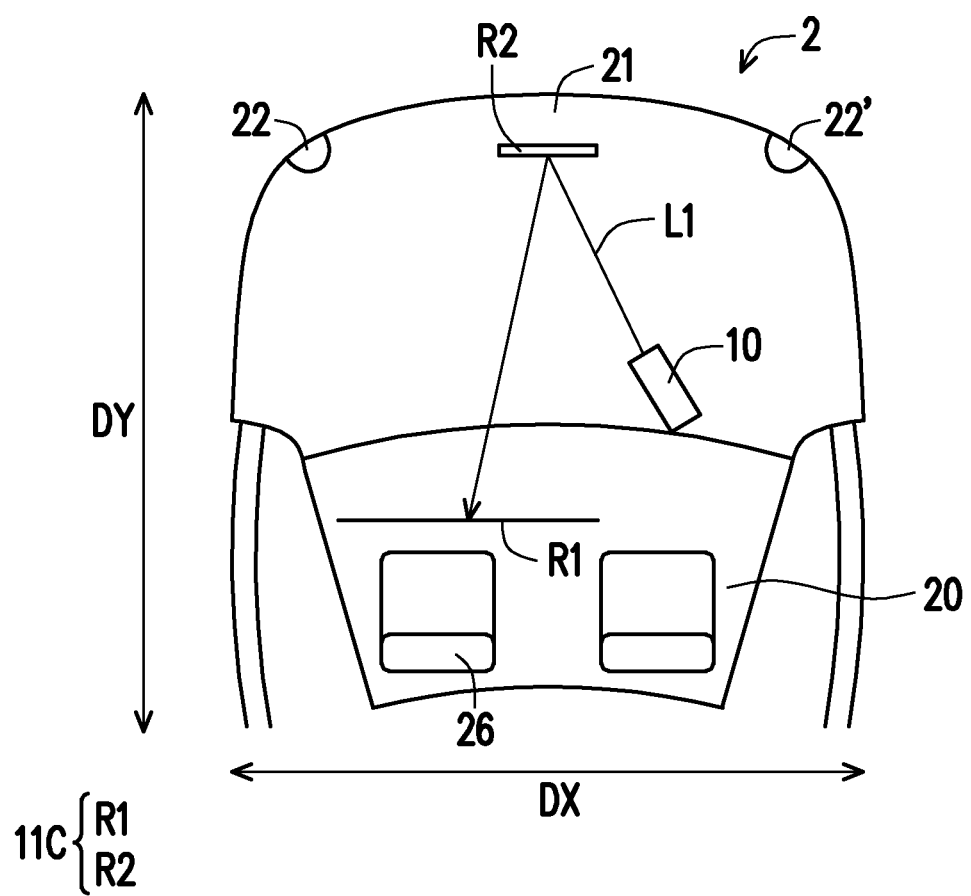
Figure 13:
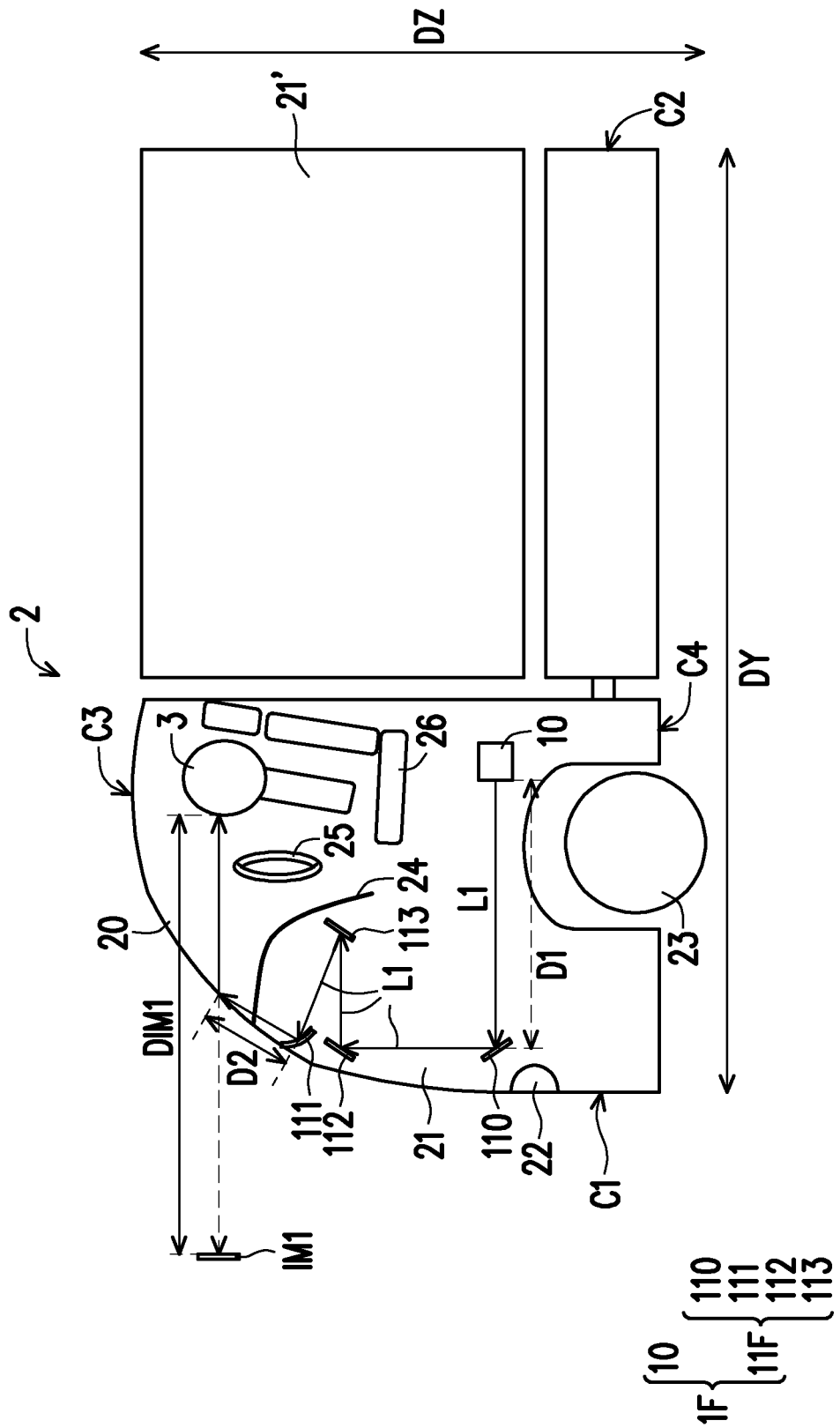
FIG. 13 and FIG. 14 are partial cross-sectional schematic views of head-up display systems according to an eleventh embodiment and a twelfth embodiment of the disclosure, respectively.
Figure 14:
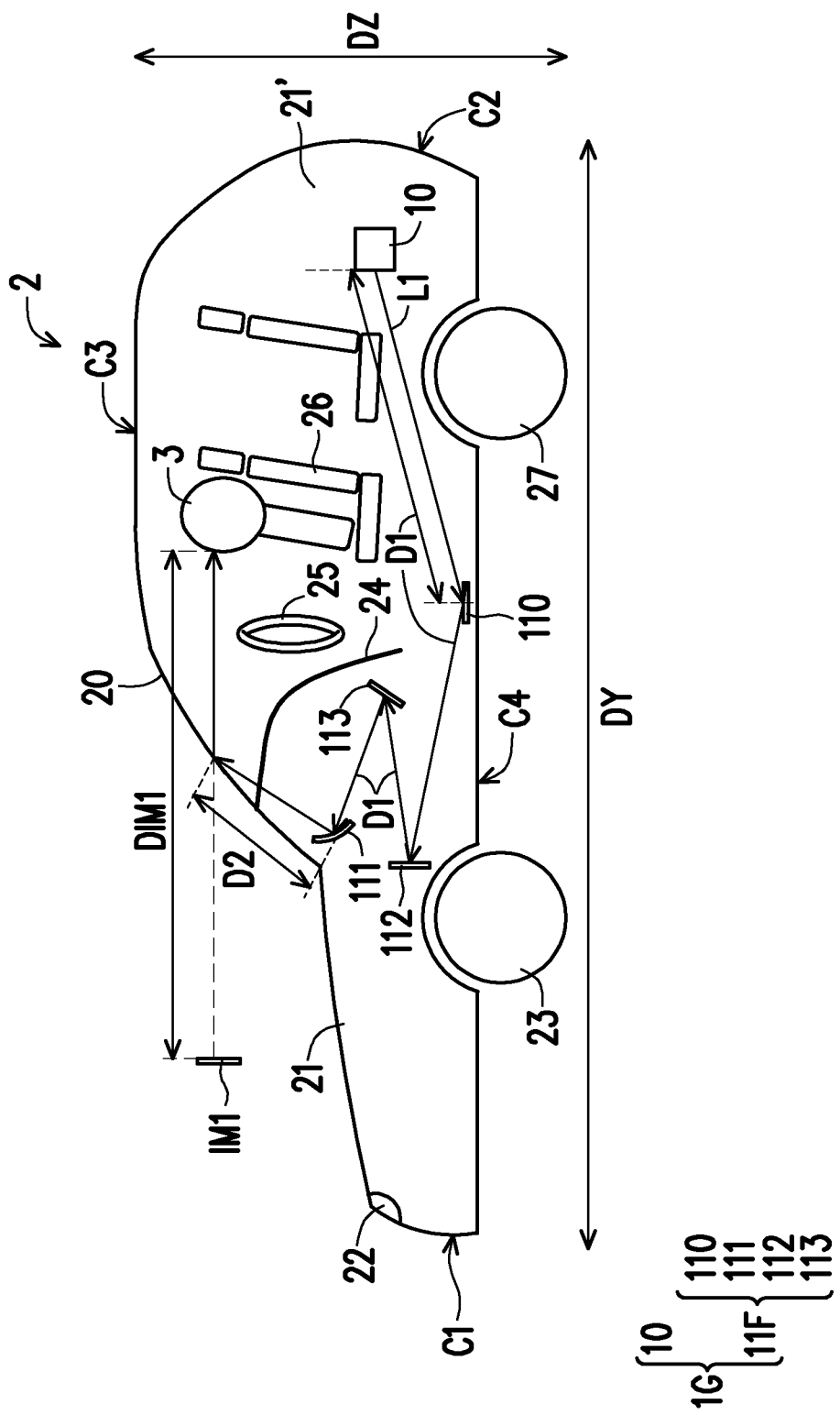

FIG. 1 is a partial cross-sectional schematic view of a head-up display system according to a first embodiment of the disclosure. FIG. 2 is an exploded schematic view of a first image generation device in FIG. 1. FIG. 3 to FIG. 7 are partial cross-sectional schematic views of head-up display systems according to a second embodiment to a sixth embodiment of the disclosure, respectively. FIG. 8 is a block schematic view of the head-up display system of the sixth embodiment. FIG. 9 to FIG. 12 are partial cross-sectional schematic views of head-up display systems according to a seventh embodiment to a tenth embodiment of the disclosure, respectively. FIG. 13 and FIG. 14 are partial cross-sectional schematic views of head-up display systems according to an eleventh embodiment and a twelfth embodiment of the disclosure, respectively.

In the embodiments of the disclosure, the head-up display system may be used for a vehicle having a windshield and an accommodating space extending away from the windshield. The vehicle is not limited to certain types. In terms of power, the vehicle may be a petroleum vehicle (such as a gasoline vehicle or a diesel vehicle), a hybrid electric-petroleum vehicle or an electric vehicle, but it is not limited thereto. The electric vehicle may have a larger accommodating space than the petroleum vehicle and the hybrid electric-petroleum vehicle. In terms of appearance or function, the vehicle may be a car, a sport utility vehicle, a sports car, a truck, a bus, a military vehicle, a racing car, a special vehicle, an engineering vehicle, or a camper, but it is not limited thereto.

The head-up display system may be used to project light having display information onto the windshield, and the light is transmitted into eyes of a driver through reflection of the windshield, so that the driver can see a virtual image corresponding to the display information in front of the driver; for example, the virtual image may be an enlarged virtual image or a minified virtual image, but it is not limited thereto. In FIG. 1, FIG. 3 to FIG. 7, and FIG. 9 to FIG. 14, for indicating a relative relationship between the head-up display system, a vehicle 2, and a driver 3, in addition to illustrating a windshield 20 and an accommodating space 21 of the vehicle 2, one or more objects of the vehicle 2 are also schematically illustrated, such as a headlight 22, a front wheel 23, a dashboard 24, a steering wheel 25, a seat 26, a rear wheel 27, and the like. However, it should be understood that the type, appearance, interior (including objects in the vehicle), or other details of the vehicle 2 may be changed according to requirements, and are not limited to those shown in the drawings.

With reference to FIG. 1, a head-up display system 1 may include, but not limited to, a first image generation device 10 and an optical system 11. One or more elements may be added to or removed from the head-up display system 1 according to requirements.

The first image generation device 10 is configured to provide a first light L1. For example, the first image generation device 10 may include, but not limited to, a liquid crystal display, a light emitting diode (LED) display, a fluorescent display, a phosphor display, a digital light processing (DLP) projector, a liquid crystal on silicon (LCoS) display, a laser scanning system or any combination of the above. The liquid crystal display may include, but not limited to, a thin film transistor display. The DLP projector may include, but not limited to, a digital micromirror device (DMD) display. The LED may include, but not limited to, an organic light emitting diode (OLED), an inorganic light emitting diode, a mini LED, a micro LED, a quantum dot (QD) light emitting diode (QLED, QDLED), or other suitable materials or any combination of the above. In addition, the appearance of the image generation device may be rectangular, circular, polygonal, in a shape with curved edges or in other suitable shapes.

With reference to FIG. 2, in some embodiments, the first image generation device 10 may include, but not limited to, a light source 100, a first light moderator 101, a display panel 102, and a second light moderator 103. One or more elements may be added to or removed from the first image generation device 10 according to requirements.

The light source 100 may be configured to provide an illumination light L0, and the type of the light source 100 is not limited. For example, the light source 100 may include, but not limited to, a direct type light source or an edge type light source. In some embodiments, though not shown, the light source 100 may include a circuit board, a light emitting element, and a heat sink. However, it is not limited thereto. One or more elements may be added to or removed from the light source 100 according to requirements. The light emitting element may include an LED, which may include, for example but not limited to, a mini LED or a micro LED.

The first light moderator 101 is located in a transmission path of the illumination light L0 from the light source 100 and is disposed between the light source 100 and the display panel 102. In other words, the illumination light L0 from the light source 100 may pass through the first light moderator 101 and transmit toward the display panel 102. For example, the transmission path may be a direction D along which the light source 100, the first light moderator 101, and the display panel 102 are disposed, and the light source 100 emits the illumination light L0 toward the display panel 102. In other words, the illumination light L0 substantially transmits forward along the direction D. Note that the illumination light L0 is shown as part of a light path, and any light from the light source 100 conforming to the transmission path may fall within the scope of light covered by the disclosure.

The first light moderator 101 is located in the transmission path of the illumination light L0 traveling toward the display panel 102, such that the first light moderator 101 may be used for moderating optical parameters of the illumination light L0 (such as uniformity, collimation, focal length, haze, retardation, polarization, or the like). The illumination light L0 passes through the first light moderator 101 and forms a relay moderated light L1', such that the relay moderated light L1' may have better uniformity or collimation than the illumination light L0, but it is not limited thereto. For example, the first light moderator 101 may include, but not limited to, one or more relay optical elements, such as one or more collimators, one or more lenses, one or more prisms, one or more diffusion sheets, and/or one or more light concentrating elements, liquid crystal modulator, liquid lens, liquid crystal lens, polarizer, light splitter, dichroic elements, or the like. In the disclosure, the first light moderator 101 generally refers to an optical element substantially maintaining a transmission direction of light.

For example, the illumination light L0 emitted from the light source 100 is substantially transmitted along the direction D before passing through the relay optical element, and forms the relay moderated light L1' after passing through the relay optical element. The relay moderated light L1' maintains to be transmitted along the direction D; for example, a transmission direction of the illumination light L0 before passing through the relay optical element and a transmission direction of the relay moderated light L1' after passing through the relay optical element substantially may maintain the same transmission direction. In some embodiments, though not shown, the first light moderator 101 may include a light concentrating lens and the diffusion sheet arranged in sequence from the light source 100 to the display panel 102. However, it is not limited thereto. One or more elements may be added to or removed from the first light moderator 101 according to requirements.

The display panel 102 is located in a transmission path of the relay moderated light L1' from the first light moderator 101 and is disposed between the first light moderator 101 and the second light moderator 103. The display panel 102 may be used for converting the relay moderated light L1' into an image light L1" having the display information (including a color and/or a grayscale). For example, the display panel 102 may include, but not limited to, a non-self-emission display panel, such as a liquid crystal display panel. In some embodiments, though not shown, the display panel 102 may include a lower polarizing sheet, a work panel, and an upper polarizing sheet arranged in sequence from the first light moderator 101 to the second light moderator 103. The work panel may include an array substrate (such as a TFT substrate), a liquid crystal layer, and a color filter (CF) substrate, or may include a color filter on array (COA) substrate and a liquid crystal layer, but it is not limited thereto. One or more elements may be added to or removed from the display panel 102 according to requirements. In some embodiments, the display panel 102 may include, but not limited to, a self-luminous display panel, such as a mini LED display panel.

The second light moderator 103 is located in a transmission path of the image light L1" from the display panel 102 and is used for moderating optical parameters of the image light L1" (such as uniformity, collimation, or the like) to form a first light L1. For example, the second light moderator 103 may include, but not limited to, one or more relay optical elements, such as one or more collimators, one or more prism sheets, and/or one or more dichroic elements, liquid crystal modulator, liquid lens, liquid crystal lens, polarizer, light splitter, dichroic elements, or the like. In some embodiments, though not shown, the second light moderator 103 may include a convex lens, a concave lens, a light concentrating lens, a prism sheet, a diffusion sheet, and a dichroic element arranged in sequence. However, it is not limited thereto. One or more elements may be added to or removed from the second light moderator 103 according to requirements. In some embodiments, the second light moderator 103 may be selectively omitted, but it is not limited thereto. In other words, the image light L1" and the first light L1 are both image lights having the display information (including the color and/or the grayscale), whereas the illumination light L0 and the relay moderated light L1' are both illumination lights not having the display information. In some embodiments, the image light L1" passes through the second light moderator 103 and forms the first light L1, such that the first light L1 may have better uniformity or collimation than the image light L1", but it is not limited thereto.

With reference to FIG. 1, the first image generation device 10 is disposed in the vehicle 2. In some embodiments, the first image generation device 10 may be disposed in the accommodating space 21 extending away from the windshield 20. In the disclosure, the driver in the vehicle looks outward through the windshield 20. A vehicle front C1 is disposed in front of the windshield 20 and has a maximum distance from the windshield 20, a vehicle rear C2 is opposite to the vehicle front C1 and has a maximum distance from the windshield 20, and a direction connecting the vehicle front C1 and the vehicle rear C2 is referred to as a front-rear direction DY. In this embodiment, a space between the vehicle front C1 and the windshield 20 is the accommodating space 21, and a space between the vehicle rear C2 and the windshield 20 is an accommodating space 21'.

In addition, a direction from the seat 26 toward a vehicle roof C3 is referred to as a "top," a direction from the seat 26 toward a vehicle bottom C4 is referred to as a "bottom," and a direction connecting the vehicle roof C3 and the vehicle bottom C4 is referred to as a top-bottom direction DZ. Moreover, a direction connecting doors on both sides of the driver is referred to as a direction DX (with reference to FIG. 9 to FIG. 12). The connecting direction in the top-bottom direction DZ, the connecting direction in the front-rear direction DY, and the direction DX are perpendicular to each other. In some embodiments, taking FIG. 1 as an example, along the front-rear direction DY, the first image generation device 10 may be located near the vehicle front C1. In detail, along the front-rear direction DY, the first image generation device 10 may be disposed between the headlight 22 and the front wheel 23, but it is not limited thereto.

In other embodiments, the first image generation device 10 may be disposed at the vehicle rear C2 or any other suitable positions. The word "extending away" in the disclosure means a distance to an element becomes increasingly larger.

The optical system 11 may be configured to reflect the first light L1. Specifically, the optical system 11 may be designed for adjusting a transmission direction of the first light L1, such that the first light L1 is projected onto the windshield 20 and is reflected by the windshield 20 into eyes of the driver 3.

Taking FIG. 1 as an example, the first light L1 from the first image generation device 10 is, for example, transmitted toward the vehicle rear C2, and the optical system 11 may be designed for adjusting the transmission direction of the first light L1 by at least one reflection or by at least one reflection and at least one refraction, so that the first light L1 is transmitted toward the windshield 20. For example, the optical system 11 may include one or multiple reflective elements. The reflective element may include, for example but not limited to, a plane mirror, a curved mirror, an aspheric mirror, or a dichroic mirror. In some embodiments, as shown in FIG. 1, the optical system 11 may include, but not limited to, a reflective element 110 and a reflective element 111. One or more elements may be added to or removed from the optical system 11 according to requirements.

The reflective element 110 is located in a transmission path of the first light L1 from the first image generation device 10 and is disposed between the first image generation device 10 and the reflective element 111. For example, the reflective element 110 may be a plane mirror, but it is not limited thereto.

The reflective element 111 is located in the transmission path of the first light L1 reflected by the reflective element 110 and is disposed between the reflective element 110 and the windshield 20. For example, the reflective element 111 may be a curved mirror, but it is not limited thereto.

Taking FIG. 1 as an example, the first light L1 from the first image generation device 10 may be sequentially reflected by the reflective element 110, the reflective element 111, and the windshield 20. Then, the first light L1 may be transmitted into the eyes of the driver 3, so that the driver 3 can see a virtual image IM1 corresponding to the display information in front of the driver 3. In other words, the virtual image IM1 having the display information may be imaged on a road in front of the windshield 20 or on the accommodating space 21 in front of the windshield 20, or, for example but not limited to, on a vehicle shell or an engine hood in front of the windshield 20. When the vehicle 2 is moving, the driver 3 may see the virtual image IM1 corresponding to the display information through the windshield 20 and may see road conditions outside the vehicle 2 at the same time. In some embodiments, a first distance D1 between the first image generation device 10 and the optical system 11 may be increased to increase a virtual image distance, such as a distance DIM1. With this design, the first distance D1 between the first image generation device 10 and the optical system 11 is, for example, greater than a second distance D2 between the optical system 11 and the windshield 20. The first distance D1 may be, for example, a distance from a final light exit surface of the first image generation device 10 (such as an outer surface of the upper polarizing sheet) to an optical element (such as the reflective element 110 in FIG. 1) at a light entrance of the optical system 11 in a cross-sectional view. The second distance D2 may be, for example, a distance from an optical element (such as the reflective element 111 in FIG. 1) at a light exit of the optical system 11 to the windshield 20 in a cross-sectional view. Suitable measurement methods may be selected according to product conditions, but they are not limited thereto.

For example, the first distance D1 and/or the second distance D2 may be actually measured by outputting an image pattern from the first image generation device 10 and confirming a position and/or a center point of an image by using other objects. The first distance D1 is defined as a minimum connection distance from a center point of an image pattern on the final light exit surface (such as the outer surface of the upper polarizing sheet) of the first image generation device 10 to a center point of an image pattern on the optical element (such as the reflective element 110 in FIG. 1) at the light entrance of the optical system 11. For example, a piece of paper may be disposed on the final light exit surface of the first image generation device 10, and another piece of paper may be disposed on the optical element (such as the reflective element 110 in FIG. 1) at the light entrance of the optical system 11. When the first image generation device 10 outputs a rectangular image pattern, a rectangular image pattern may be obtained on the paper disposed on and covering the first image generation device 10, and a rectangular image pattern may also be obtained on the paper disposed on and covering the reflective element 110. The first distance D1 is a minimum connection distance from a center point of the rectangular image pattern on the paper on the first image generation device 10 to a center point of the rectangular image pattern on the paper on the reflective element 110. Similarly, the second distance D2 is defined as a distance from a center point of a rectangular image pattern on the optical element (such as the reflective element 111 in FIG. 1) at the light exit of the optical system 11 to a center point of a rectangular image pattern on the windshield 20. In this embodiment, the image pattern may be rectangular or in other irregular shapes, but it is not limited thereto. The center point of the image pattern may be a center point of a largest quadrilateral surrounding the image pattern or a center point of a smallest rectangle surrounding the image pattern.

It is concerned that the vehicle 2 may shake during moving and thus lead to displacement of the optical element, causing the position of the virtual image IM1 to be shifted accordingly. In some embodiments, a reasonable ratio of the first distance D1 to the second distance D2 may be designed based on geometrical optics principles of imaging, but it is not limited thereto. For example, the ratio of the first distance D1 to the second distance D2 may be greater than or equal to 1 and less than or equal to 20 ($1 \leq D1/D2 \leq 20$); for example, the driver may be less likely to feel a change in imaging position, but it is not limited thereto. For example, when displacement of 1 millimeter (mm) occurs between the first image generation device 10 and the optical system 11, a change in imaging focal length may still be maintained within 10 meters (m). In the embodiments of the disclosure, an optical microscope (OM), an oval thickness gauge, an infrared rangefinder, or other suitable methods may be used for measuring a width, thickness, height or area of each element, or a distance or spacing between elements. In detail, according to some embodiments, the infrared rangefinder may be used for measuring the width, thickness, height or area of each element, or the distance or spacing between elements.

Figure 3:
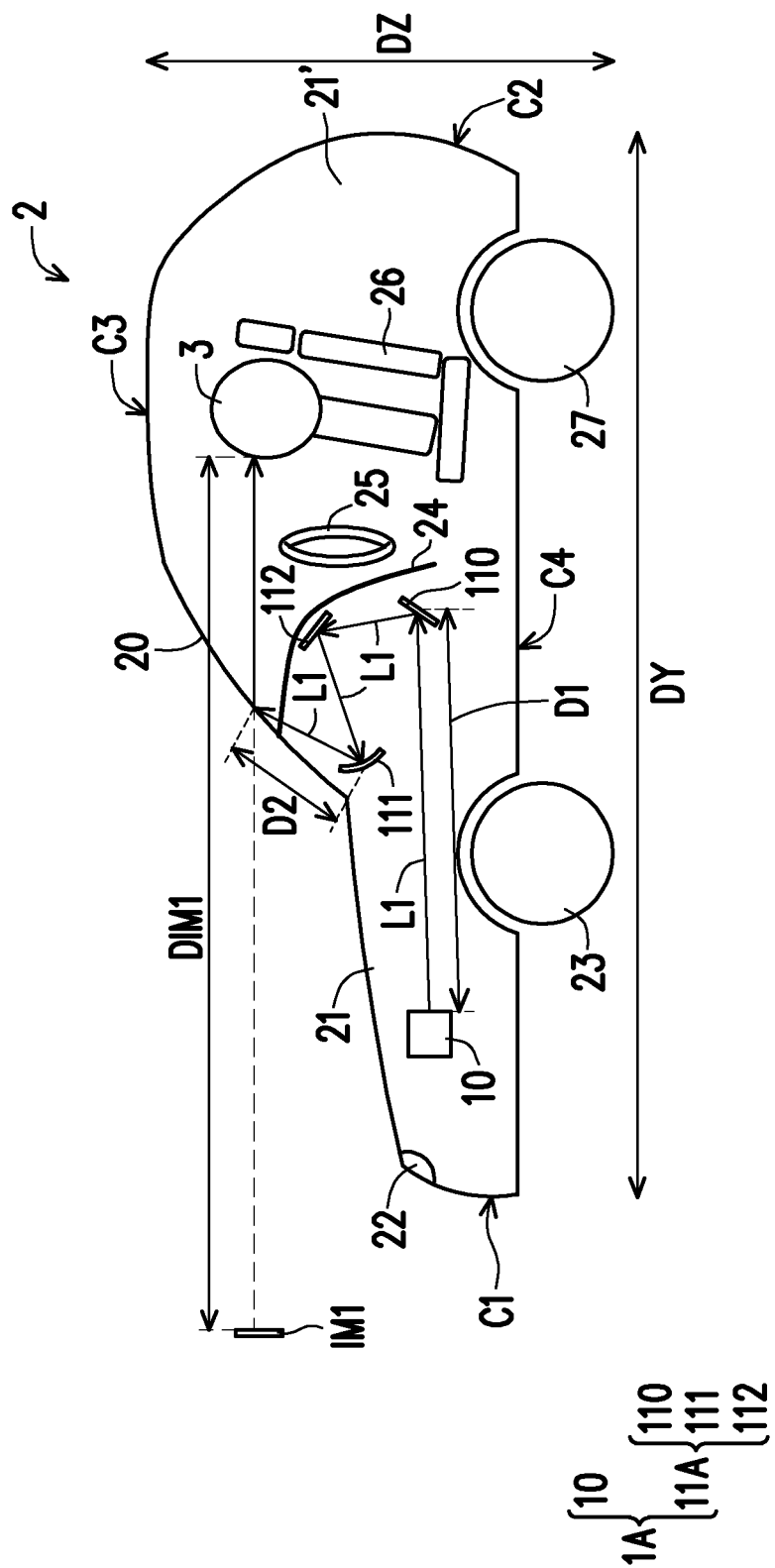
FIG. 3 to FIG. 7 are partial cross-sectional schematic views of head-up display systems according to a second embodiment to a sixth embodiment of the disclosure, respectively.

Please refer to FIG. 3. A difference between a head-up display system 1A in FIG. 3 and the head-up display system 1 in FIG. 1 is explained below. In the head-up display system 1A, an optical system 11A further includes a reflective element 112. The reflective element 112 is located in the transmission path of the first light L1 reflected by the reflective element 110 and is disposed between the reflective element 110 and the reflective element 111. The reflective element 112 may include, but not limited to, a plane mirror, a curved mirror, or a dichroic mirror. In FIG. 3, the reflective element 112 is, for example but not limited to, a plane mirror.

Figure 4:
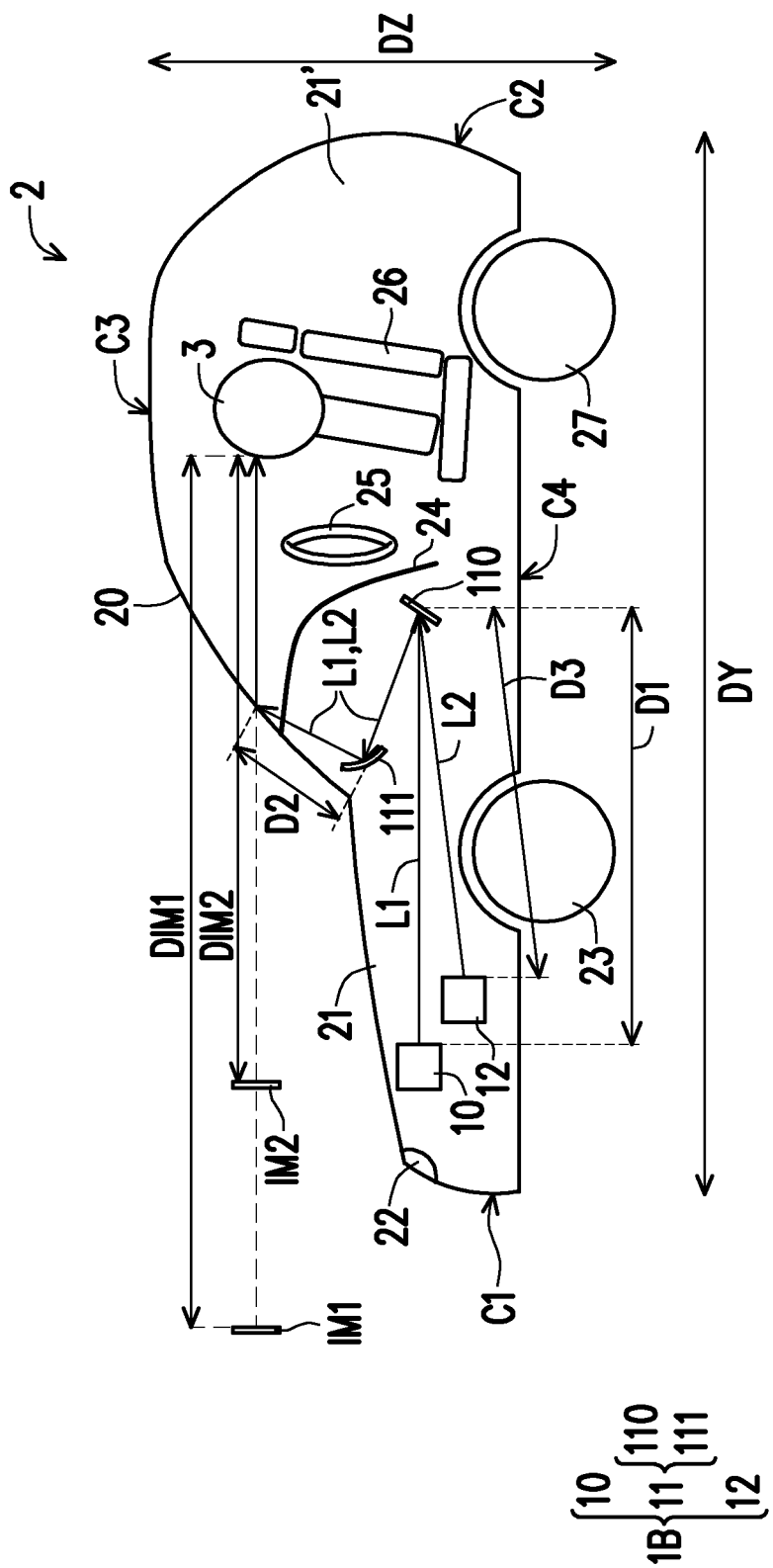

Please refer to FIG. 4. A difference between a head-up display system 1B in FIG. 4 and the head-up display system 1 in FIG. 1 is explained below. The head-up display system 1B further includes a second image generation device 12. The second image generation device 12 is configured to provide a second light L2 to the optical system 11. For example, the second image generation device 12 may include, but not limited to, a liquid crystal display, a DLP projector, an LCoS display, or a laser scanning system. For a relative relationship between elements included by the second image generation device 12, reference may be made to the description of the first image generation device 10, and details are not described herein. Also, the second light is an image lights having the display information (including the color and/or the grayscale).

The second image generation device 12 is disposed in the vehicle 2. In some embodiments, the second image generation device 12 may also be disposed in the accommodating space 21 extending away from the windshield 20. In some embodiments, the second image generation device 12 may also be located near the vehicle front, for example, between the headlight 22 and the front wheel 23. The second image generation device 12 and the first image generation device 10 are disposed at different positions. For example, the second image generation device 12 partially overlaps the first image generation device 10 on the top-bottom direction DZ, but it is not limited thereto. In other embodiments, the second image generation device 12 may be disposed at the vehicle bottom, the vehicle rear, or any other suitable positions.

In some embodiments, as shown in FIG. 4, the second light L2 of the second image generation device 12 may be transmitted to the windshield 20 by the reflective element 110 and the reflective element 111 in the optical system 11. Then, the second light L2 is transmitted into the eyes of the driver 3 through reflection of the windshield 20, so that the driver 3 can see a virtual image IM2 corresponding to display information in front of the driver 3. Since the optical system 11 may not be configured with the optical element used for transmitting the second light L2 of the second image generation device 12 to the windshield 20, space for accommodating the optical system 11 in the vehicle 2 may be saved. However, in other embodiments, though not shown, the second light L2 of the second image generation device 12 and the first light L1 of the first image generation device 10 may also be transmitted to the windshield 20 by different optical elements in the optical system 11.

In some embodiments, a third distance D3 between the second image generation device 12 and the optical system 11 may also be increased to increase a virtual image distance, such as a distance DIM2. In addition, the third distance D3 may be different from the first distance D1, such that the virtual image IM1 and the virtual image IM2 have different depths of field. For example, the third distance D3 between the second image generation device 12 and the optical system 11 may be greater than the second distance D2 and less than the first distance D1. In this way, the virtual image IM1 may have a depth of field greater than that of the virtual image IM2. The virtual image IM1 and the virtual image IM2, for example, include different display information. For example, the virtual image IM1 may be imaged on a road and display information such as landmarks, road names, or the like, whereas the virtual image IM2 may be imaged between the virtual image IM1 and the driver 3 (such as on the vehicle shell in front of the windshield 20 or on the engine hood) and display information such as speed, remaining fuel, temperature, or the like, but they are not limited thereto. Alternatively, the second image generation device 12 may be disposed near the first image generation device 11, so that the virtual image IM2 and the virtual image IM1 may have a same depth of field, but it is not limited thereto.

In other embodiments, the optical system 11 may be replaced with the optical system 11A in FIG. 3. Alternatively, one or more elements may be added to or removed from the optical system 11 according to requirements.

Figure 5:
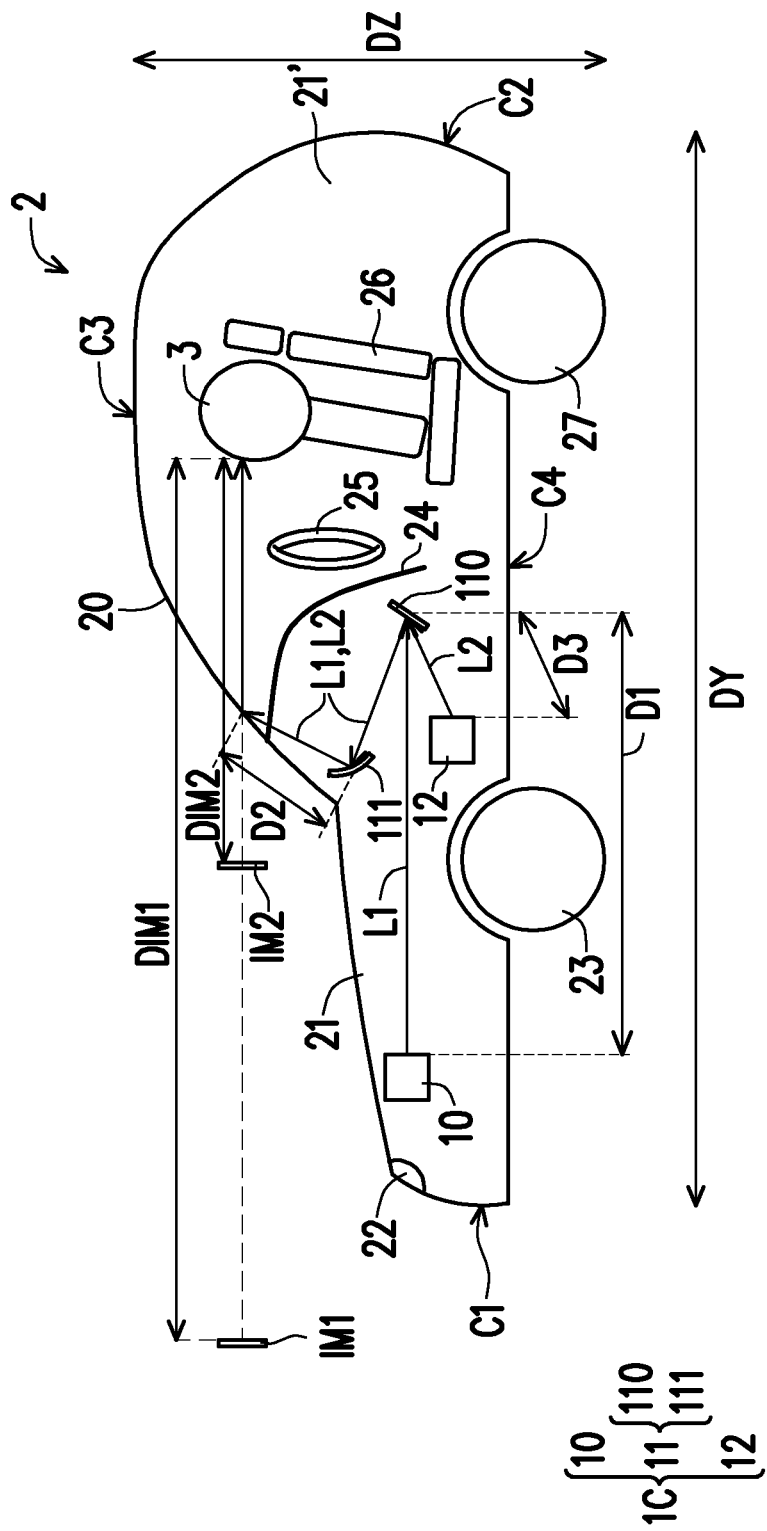

Please refer to FIG. 5. A difference between a head-up display system 1C in FIG. 5 and the head-up display system 1B in FIG. 4 is explained below. In the head-up display system 1C, the second image generation device 12 is, for example, disposed between the front wheel 23 and the dashboard 24. The word "between" referred to in the disclosure may be, for example, from a same perspective, at least part of an element A is disposed between an element B and an element C, and the element A, the element B, and the element C are not limited to being on a same connecting line. However, a position of the second image generation device 12 in the vehicle 2 may be changed according to requirements and is not limited to that shown in the drawings.

Figure 6:
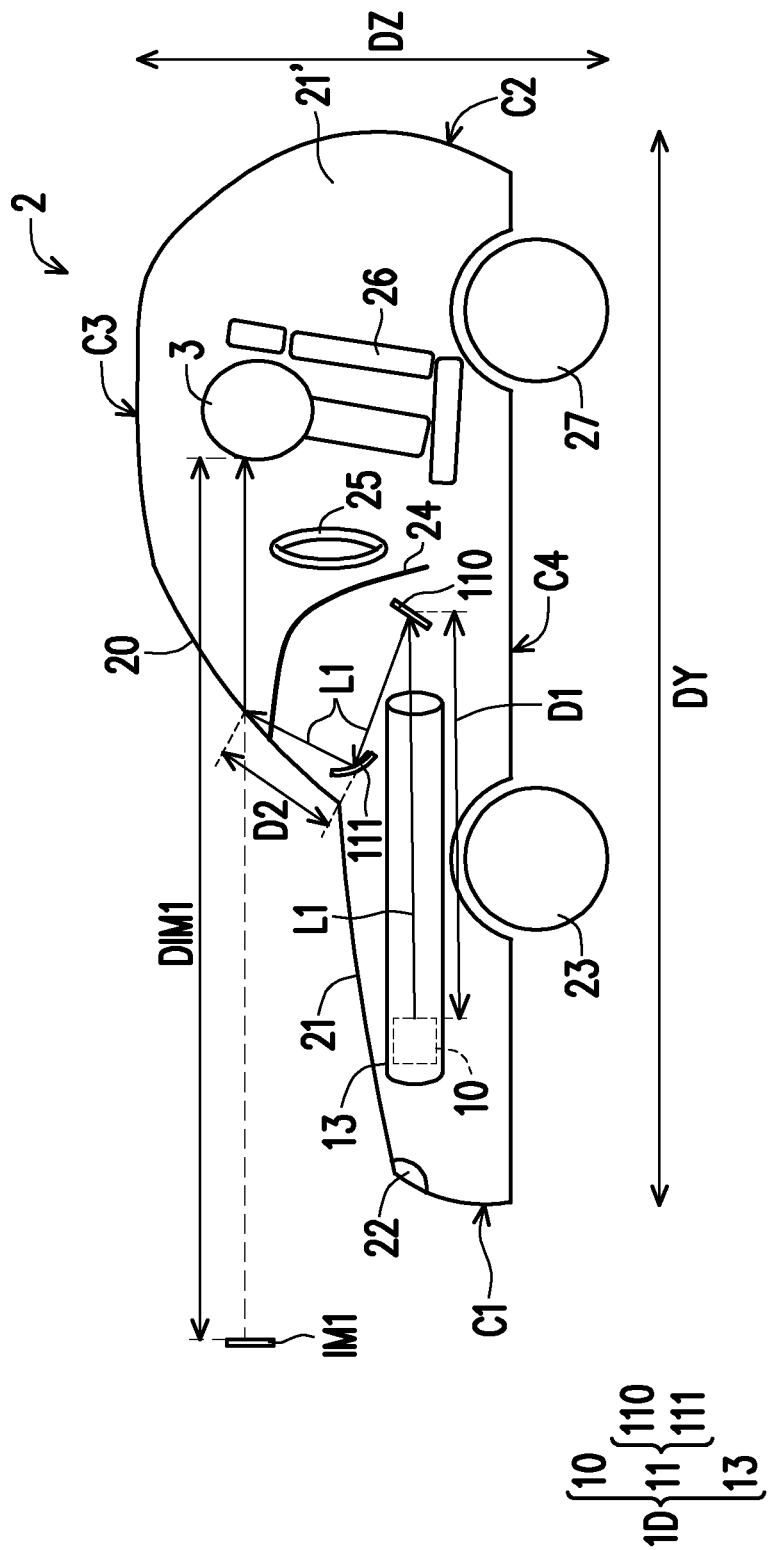

Please refer to FIG. 6. A difference between a head-up display system 1D in FIG. 6 and the head-up display system 1 in FIG. 1 is explained below. The head-up display system 1D further includes a light guiding element 13, through which the first light L1 reaches the optical system 11 from the first image generation device 10. For example, the light guiding element 13 may be used for reducing interference of stray light, such as reducing interference of ambient light from outside or shielding dust to reduce light loss caused by light scattering due to the dust. In some embodiments, the light guiding element 13 may include an optical fiber, a hollow tube or a hollow box made of a light shielding material (such as a light absorbing material or a light reflecting material), or an extension of an outer shell (not shown) of a head-up display optical system. As shown in FIG. 6, the first image generation device 10 is disposed in the light guiding element 13, and a portion of a transmission path of the first light L1 from the first image generation device 10 to the reflective element 110 of the optical system 11 is in the light guiding element 13.

In other embodiments, though not shown, the optical system 11 may be replaced with the optical system 11A in FIG. 3. Alternatively, one or more elements may be added to or removed from the optical system 11 according to requirements. Though not shown, the head-up display system 1D may further include the second image generation device 12 in FIG. 4 or FIG. 5 and/or another light guiding element including the second image generation device 12 and a portion of a transmission path of the second light L2. Alternatively, the first image generation device 10 and the second image generation device 12 may be disposed in the light guiding elements 13 together.

Figure 7:
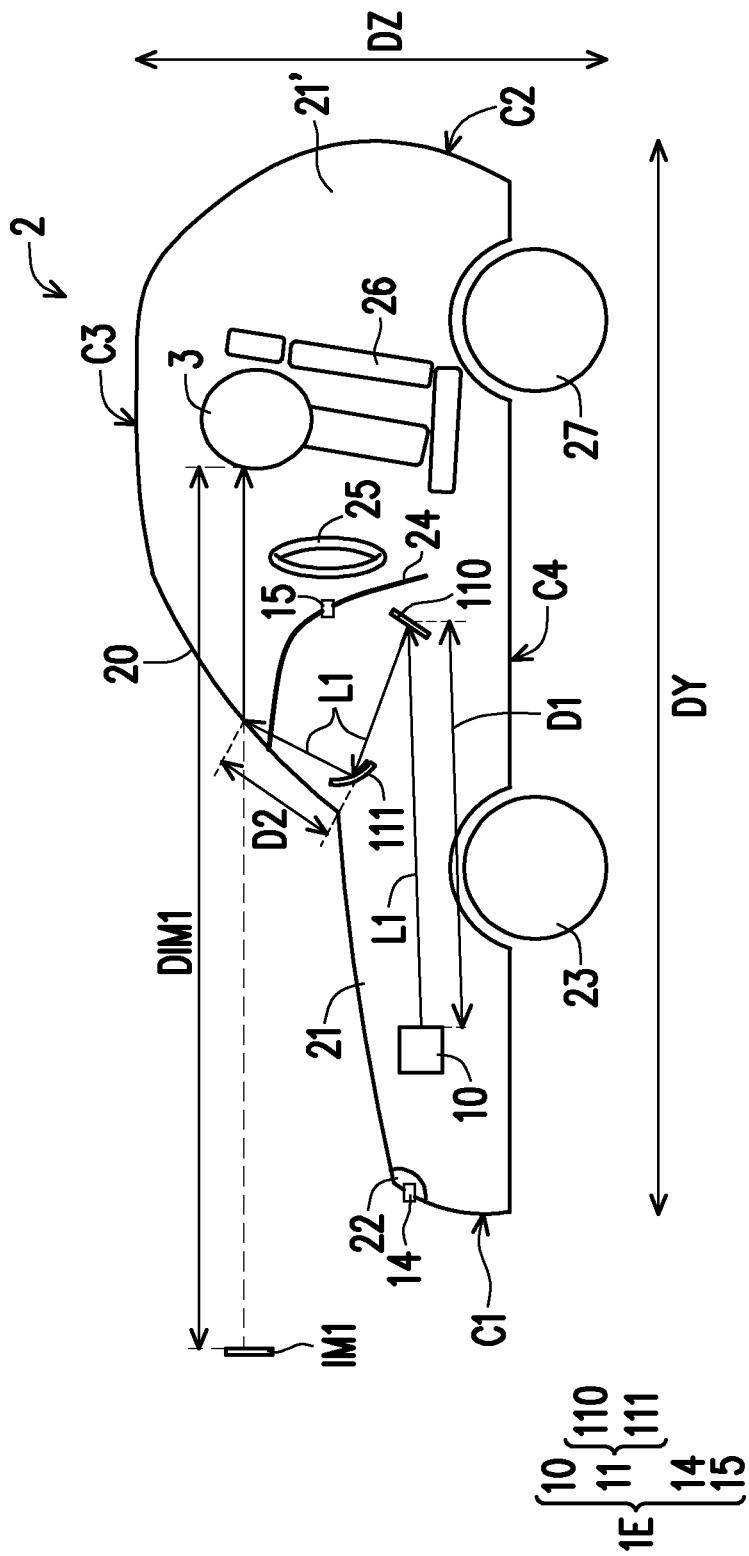
Figure 8:
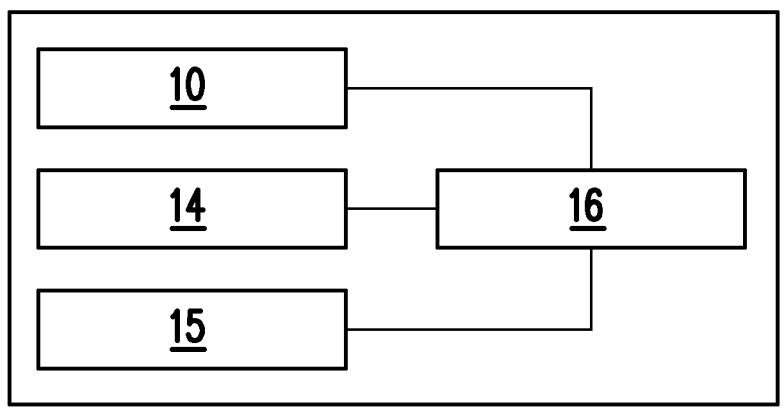
FIG. 8 is a block schematic view of the head-up display system of the sixth embodiment.

Please refer to FIG. 7. A difference between a head-up display system 1E in FIG. 7 and the head-up display system 1 in FIG. 1 is explained below. The head-up display system 1E further includes an external sensor 14 and an internal sensor 15. The external sensor 14 is disposed outside the vehicle 2. For example, the external sensor 14 may be disposed on the headlight 22; for example, the external sensor 14 may be disposed in direct contact with the headlight 22 for detecting external information, such as road information, external light intensity, or the like, but it is not limited thereto. The external sensor 14 may include, but not limited to, an infrared camera. In some embodiments (not shown), the external sensor 14 may be disposed without directly contacting the headlight 22. For example, the external sensor 14 may be disposed between the two adjacent headlights 22, but it is not limited thereto. The internal sensor 15 is disposed inside the vehicle 2. For example, the internal sensor 15 may be disposed on the dashboard 24; for example, the internal sensor 15 may be disposed in direct contact with the dashboard 24 for detecting information of the driver 3, such as a line of sight, an eye height, or the like, but it is not limited thereto. In some embodiments (not shown), the internal sensor 15 may be disposed without directly contacting the dashboard 24. For example, the internal sensor 15 may be disposed on the windshield 20, but it is not limited thereto.

With reference to FIG. 8, the head-up display system 1E in FIG. 8 may further include a processor 16. The processor 16 is electrically coupled to the first image generation device 10, the external sensor 14, and the internal sensor 15, and the processor 16 may control the first image generation device 10 according to information received by the external sensor 14 and/or the internal sensor 15. For example, the processor 16 may receive information sensed by the external sensor 14 such as road information, external light intensity, or the like, and/or information sensed by the internal sensor 15 such as the line of sight, the eye height of the driver 3, or the like. The first image generation device 10 may adjust brightness or position of the virtual image IM1 according to information of the processor 16.

In other embodiments, though not shown, the optical system 11 may be replaced with the optical system 11A in FIG. 3. Alternatively, one or more elements may be added to or removed from the optical system 11 according to requirements. Though not shown, the head-up display system 1E may further include the second image generation device 12 in FIG. 4 or FIG. 5 and/or one or more light guiding elements 13 shown in FIG. 6.

Figure 9:
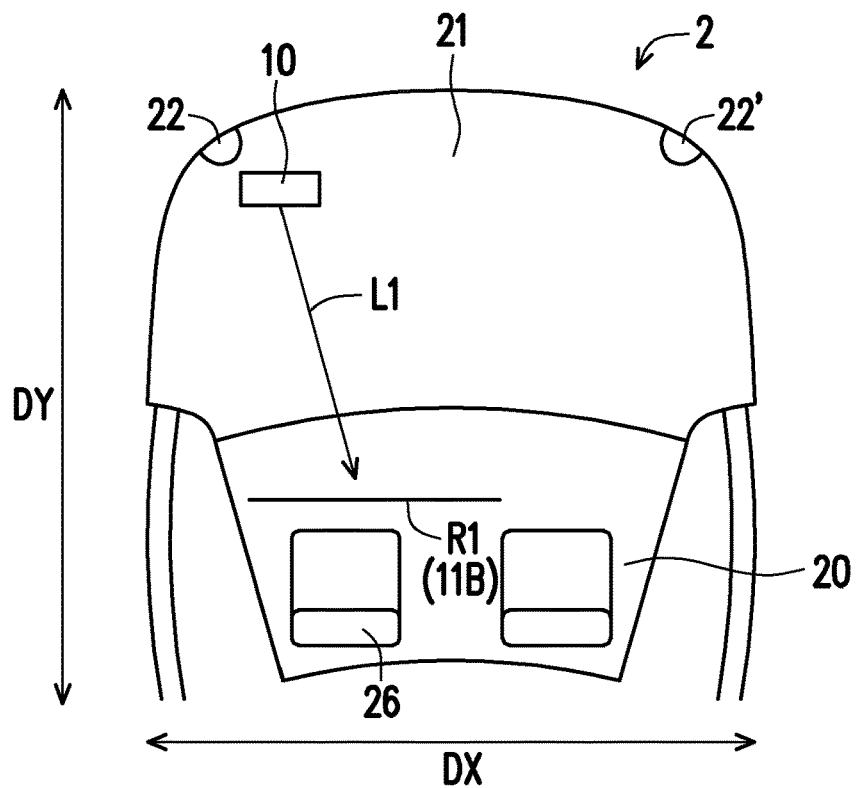
FIG. 9 to FIG. 12 are partial cross-sectional schematic views of head-up display systems according to a seventh embodiment to a tenth embodiment of the disclosure, respectively.
Figure 10:
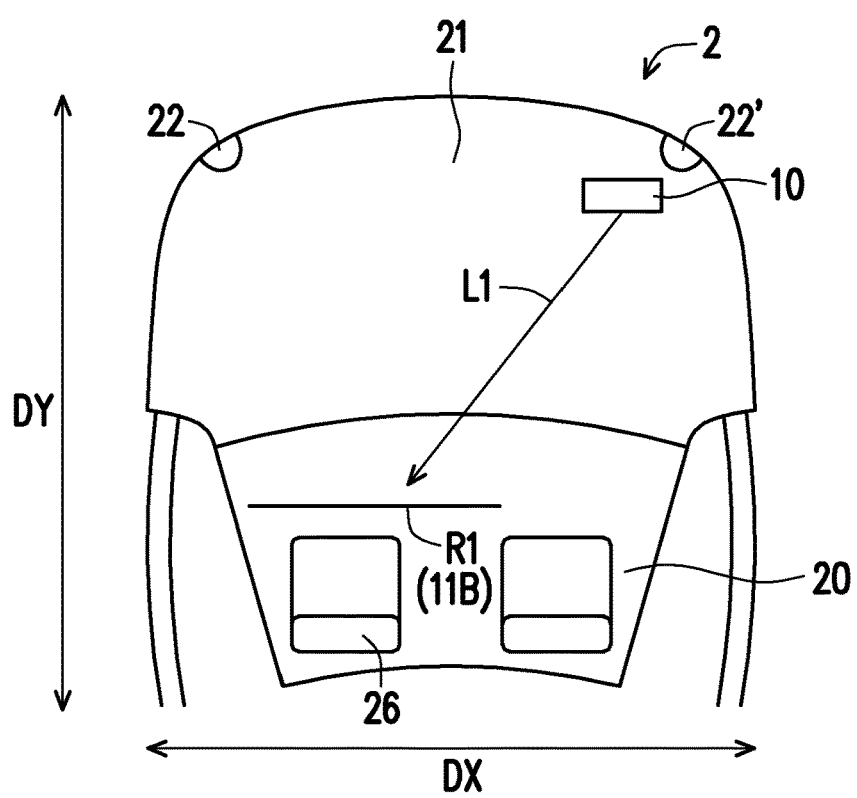

In some embodiments, when viewed from the vehicle roof to the vehicle bottom, as shown in FIG. 9, the first image generation device 10 may be disposed in the accommodating space 21 of the vehicle 2 and near the headlight 22, and an optical system 11B may be disposed under the windshield 20. The optical system 11B may include a reflective element R1, which may include, but not limited to, a plane mirror, a curved mirror, or a dichroic mirror. It should be understood that positions of the first image generation device 10 and the optical system 11 in the vehicle 2 or the number of the reflective elements in the optical system 11 may be modified according to requirements. As shown in FIG. 10, the first image generation device 10 may also be disposed in the accommodating space 21 of the vehicle 2 and near a headlight 22'. A minimum distance between the headlight 22 and the driver is less than a minimum distance between the headlight 22' and the driver.

On the other hand, in some embodiments, the optical system may further include a reflective element R2 disposed in the accommodating space 21. As shown in FIG. 11, an optical system 11C may include the reflective element R1 disposed under the windshield 20 and the reflective element R2 disposed in the accommodating space 21. The reflective element R2 may include, but not limited to, a plane mirror, a curved mirror, or a dichroic mirror. In FIG. 11, the reflective element R2 and the first image generation device 10 are both located near the vehicle front, and the reflective element R2 and the first image generation device 10 are, for example, arranged along the direction DX; for example, when one of the reflective element R2 and the first image generation device 10 is disposed near the headlight 22, the other may be disposed near the headlight 22'. However, a relative relationship between the first image generation device 10 and the reflective element R2 may be changed according to requirements. As shown in FIG. 12, the first image generation device 10 may be disposed between the reflective element R2 and the windshield 20 along the DY direction.

Please refer to FIG. 13. A difference between a head-up display system 1F in FIG. 13 and the head-up display system 1 in FIG. 1 is explained below. In the head-up display system 1F, the first image generation device 10 is, for example, disposed at the bottom. For example, the first image generation device 10 is disposed between the seat 26 and the vehicle bottom, but it is not limited thereto. In addition, an optical system 11F further includes the reflective element 112 and a reflective element 113. The reflective element 112 is located in a transmission path of the first light L1 reflected by the reflective element 110 and is disposed between the reflective element 110 and the reflective element 113. The reflective element 113 is located in a transmission path of the first light L1 reflected by the reflective element 112 and is disposed between the reflective element 112 and the reflective element 111. The reflective element 112 or the reflective element 113 may include, but not limited to, one or more spherical mirrors, one or more plane mirrors, one or more curved mirrors, or one or more dichroic mirrors. In FIG. 3, the reflective element 112 and the reflective element 113 are, for example but not limited to, plane mirrors.

In other embodiments not shown, one or more elements may be added to or removed from the optical system 11F according to requirements. Though not shown, the head-up display system 1F may further include the second image generation device 12 in FIG. 4 or FIG. 5 and/or one or more light guiding elements 13 shown in FIG. 6.

Please refer to FIG. 14. A difference between a head-up display system 1G in FIG. 14 and the head-up display system 1F in FIG. 13 is explained below. In the head-up display system 1G, the first image generation device 10 is, for example, located near the vehicle rear. For example, the first image generation device 10 may be disposed between the rear wheel 27 and the vehicle rear, but it is not limited thereto. Moreover, the reflective element 110 is, for example, disposed under the seat 26. However, positions of the first image generation device 10 and the reflective elements in the optical system 11F may be changed according to requirements and are not limited to those shown in the drawings.

In summary, in the embodiments of the disclosure, the virtual image distance may be increased by increasing the first distance between the first image generation device and the optical system, thereby satisfying the requirement of imaging the display information at a distance. In some embodiments, the second image generation device may be disposed for providing virtual images having different depths of field. In some embodiments, the light guiding element may be disposed for reducing interference of internal or external stray light or shielding particles (such as dust or the like) to reduce light loss caused by light scattering due to the particles. In addition, the driver may obtain road conditions and image information at the same time without adjusting the line of sight.

The above embodiments are only used to illustrate technical solutions of the disclosure and are not intended to limit the disclosure. Although the disclosure has been described in detail with reference to the above embodiments, people of ordinary skill in the art should understand that they may still modify the technical solutions described in the above embodiments, or replace some or all of the technical features therein with equivalents, and such modifications or replacements of corresponding technical solutions do not substantially deviate from the scope of the technical solutions of the embodiments of the disclosure.

Although the disclosure has been disclosed in the above embodiments, the embodiments are not intended to limit the disclosure. People skilled in the art may make some changes, replacements, and modifications without departing from the spirit and the scope of the disclosure, and the features between the embodiments may be arbitrarily mixed and matched to form other new embodiments. Moreover, the scope of the disclosure is limited to the processes, machines, manufacture, compositions of matter, means, methods, or steps of the particular embodiments described in the specification. People of ordinary skill in the art may understand the processes, machines, manufacture, compositions of matter, means, methods, or steps, presently existing or later to be developed from the disclosure. Those performing substantially the same function or achieving substantially the same result as the corresponding embodiments described herein may be utilized according to the disclosure. Therefore, the appended claims of the disclosure include the above processes, machines, manufacture, compositions of matter, means, methods, or steps. In addition, each claim constitutes a separate embodiment, and the scope of the disclosure also includes a combination of each claim and embodiment. The scope of the disclosure is subject to the definition of the scope of the appended claims.

What is claimed is:

1. A head-up display system for a vehicle having a windshield, a vehicle front and a vehicle rear, the head-up display system comprising:
    a first image generation device, configured to provide a first light; and
    an optical system, configured to reflect the first light;
    wherein a first distance between the first image generation device and the optical system is greater than a second distance between the optical system and the windshield,
    wherein along a first direction connecting the vehicle front and the vehicle rear, the first image generation device is located between the vehicle front and a front wheel of the vehicle,
    wherein along a second direction perpendicular to the first direction, a first headlight and a second headlight are configured along the second direction and at the vehicle front,
    wherein a minimum distance between the first headlight and a driver seat is less than a minimum distance between the second headlight and the driver seat, and the first image generation device is disposed in an accommodating space of the vehicle and a distance between the first image generation device and the second headlight is less than a distance between the first image generation device and the first headlight.

2. The head-up display system according to claim 1, wherein a ratio of the first distance to the second distance is greater than 1 and less than or equal to 20.

3. The head-up display system according to claim 1, further comprising:
    a second image generation device, configured to provide a second light to the optical system;
    wherein a third distance between the second image generation device and the optical system is greater than the second distance and less than the first distance.

4. The head-up display system according to claim 1, further comprising:
    a light guiding element, wherein the first light passes through the light guiding element from the first image generation device to the optical system.

5. The head-up display system according to claim 1, wherein the accommodating space extending away from the windshield.

6. A head-up display system for a vehicle having a windshield, a vehicle front and a vehicle rear and an accommodating space extending away from the windshield, the head-up display system comprising:
    a first image generation device, configured to provide a first light; and
    an optical system, configured to reflect the first light;
    wherein the first image generation device is disposed in the accommodating space,
    wherein along a first direction connecting the vehicle front and the vehicle rear, the first image generation device is located between the vehicle front and a front wheel of the vehicle,
    wherein along a second direction perpendicular to the first direction, a first headlight and a second headlight are configured along the second direction and at the vehicle front, wherein a minimum distance between the first headlight and a driver seat is less than a minimum distance between the second headlight and the driver seat, and a distance between the first image generation device and the second headlight is less than a distance between the first image generation device and the first headlight.

7. The head-up display system according to claim 6, wherein a first distance between the first image generation device and the optical system is greater than a second distance between the optical system and the windshield, and a ratio of the first distance to the second distance is greater than 1 and less than or equal to 20.

8. The head-up display system according to claim 6, wherein the accommodating space is disposed in front of the windshield.

* * * * *